United States Patent [19]
Spector

[11] 3,939,607
[45] Feb. 24, 1976

[54] INFLATABLE TERRARIUM ASSEMBLY

[76] Inventor: Donald Spector, 380 Mountain Road, Union City, N.J. 07087

[22] Filed: Dec. 17, 1974

[21] Appl. No.: 533,518

[52] U.S. Cl. .................. 47/34 T; 47/17; 47/34.11; 47/29; 47/28 R
[51] Int. Cl.² ......................................... A01G 9/02
[58] Field of Search ............ 47/17, 19, 28, 28.1, 34, 47/37, 41.13, 34.11, 29; 260/41 R; 135/1; 220/293 X; 206/45.34, 8 A, 423; 46/87–90; 292/75–80 X

[56] References Cited
UNITED STATES PATENTS

| 126,892 | 5/1872 | Mayo | 292/83 |
|---|---|---|---|
| 1,427,180 | 8/1922 | Welch | 47/29 |
| 2,228,730 | 1/1941 | Pinnecker | 47/41.13 |
| 2,297,150 | 9/1942 | Hunter | 47/28.1 |
| 2,754,836 | 7/1956 | Darby | 47/28.1 |
| 3,029,558 | 4/1962 | Odenkirk | 47/28.1 |
| 3,144,166 | 8/1964 | Cross et al. | 292/80 X |
| 3,176,982 | 4/1965 | O'Daniell | 46/87 X |
| 3,206,892 | 9/1965 | Telkes et al. | 47/29 |
| 3,269,578 | 8/1966 | Lewis | 206/45.34 |
| 3,537,956 | 6/1970 | Falcone et al. | 220/293 X |

*Primary Examiner*—Edgar S. Burr
*Assistant Examiner*—James R. Feyrer

[57] ABSTRACT

A collapsible terrarium assembly which is inflatable to assume a desired configuration for transparently housing a potted plant or other article to be protectively enclosed. The structure is constituted by a disc-like base and a dome attachable thereto. The dome is formed by an open, flexible plastic envelope whose rim is secured to a coupling ring which is joinable to the base to form a hermetically-sealed enclosure, the envelope including a valve for inflating the dome.

5 Claims, 5 Drawing Figures

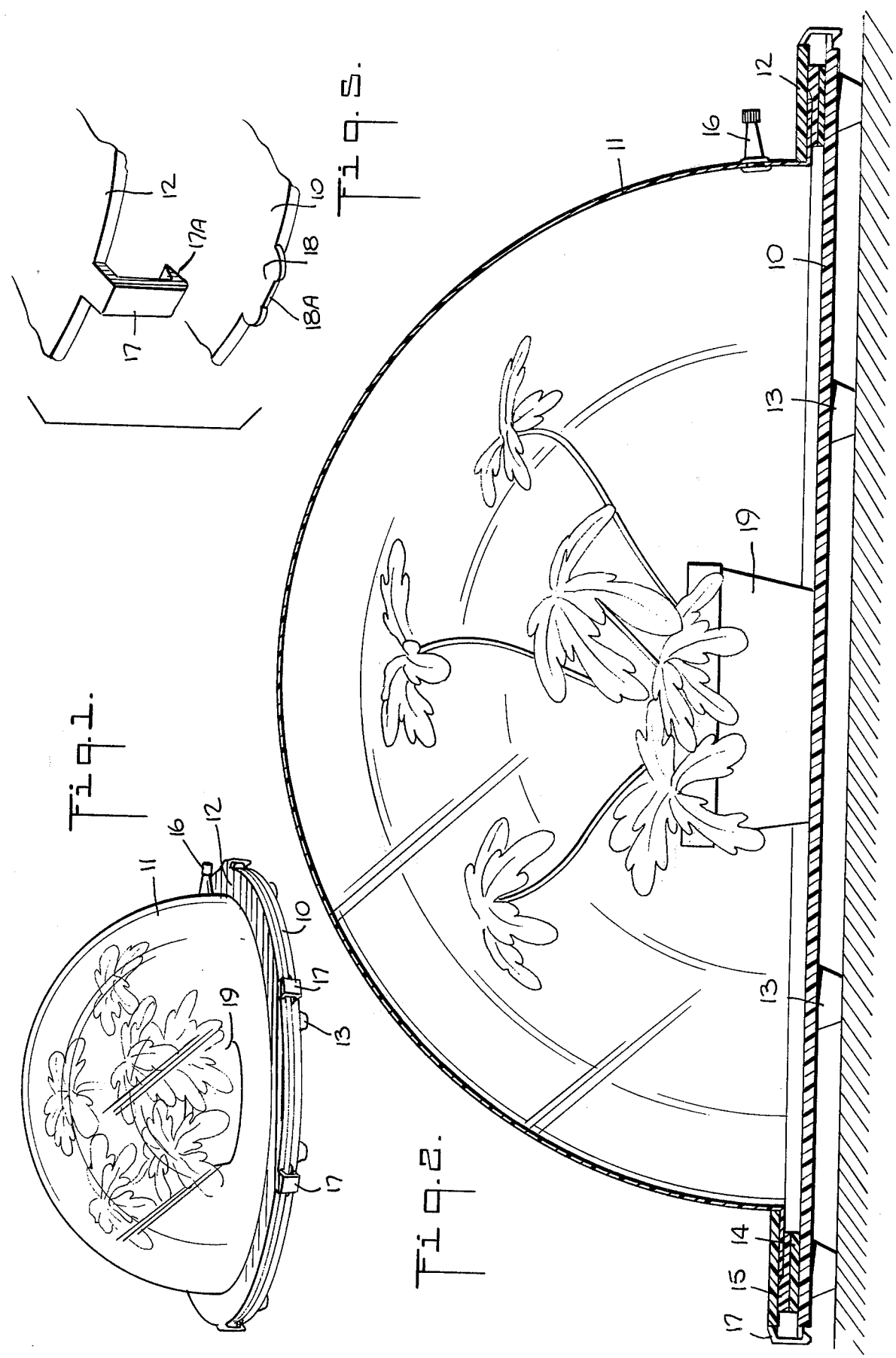

INFLATABLE TERRARIUM ASSEMBLY

BACKGROUND OF INVENTION

This invention relates generally to terrarium structures, and more particularly to a collapsible terrarium which is inflatable to assume a desired configuration.

A terrarium is fully enclosed, small container wholly or predominantly made of glass or clear plastic material, the terrarium being adapted for the indoor cultivation of moisture-loving plants. The earliest form, known as a Wardian case, was invented by an English botanist in the 19th century, the case being constituted by a box-like glass dome fitted over a metal, earthenware or wooden base serving as a pot for growing living plants. Normally, moisture from an exposed plant is dissipated into the atmosphere through transpiration, so that the plant must be watered at frequent intervals, but in a terrarium the loss of moisture is slight and it is not necessary to replenish the water except occasionally.

Because of the growing popularity of terrariums, they are now commercially available in rigid plastic form. The terrarium consists of a plastic base having a pot formation for receiving plant soil and a plastic dome or shell which fits over the base. Plastic terrariums come in a range of sizes, and the larger ones are not only fairly expensive, but because of their size they are not easily stored when not in use, particularly in a small apartment dwelling.

Moreover, since in a standard terrarium the plant is grown in soil held in the base, one cannot readily change the plant or shift it to another setting, for the plant must be dug out of the soil.

SUMMARY OF INVENTION

In view of the foregoing, it is the main object of this invention to provide a terrarium which makes use of a collapsible, clear, flexible plastic dome mountable on a flat base to create a hermetically-sealed enclosure, the dome being inflatable to assume a desired configuration.

The significant advantage of the invention is that the terrarium in its collapsed state is substantially flat and may be inexpensively shipped in a compact box or stored in a small space.

More particularly, it is an object of this invention to provide a terrarium which may be readily dismantled or assembled, whereby a potted plant may be installed within the terrarium or removed therefrom without difficulty.

Also an object of the invention is to provide a terrarium structure which may be manufactured and sold at low cost, even in relatively large sizes.

While the invention will be desribed as a plant terrarium, it will be appreciated that the same structure may be used for other useful purposes, for it can function effectively as a bell jar to enclose stuffed animals, delicate porcelain objets d'art and other viewable objects that require protection against handling.

Briefly stated, these objects are attained in a terrarium structure comprising a disc-like base and a collapsible dome attached to the base and constituted by a coupling ring secured to the rim of an open envelope formed of clear flexible plastic material having a valve mounted thereon. The underside of the ring has an annular gasket secured thereon which, when the ring is attached to the base, engages a matching gasket secured to the face of the base. The ring is provided with circumferentially spaced snap fastener elements which engage complementary elements on the periphery of the base, whereby to assemble the terrarium, the ring of the dome is simply pressed onto the base.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a terrarium in accordance with the invention;

FIG. 2 is a cross sectional view of the device;

FIG. 5 is a detail showing like elements of the snap fastener.

DESCRIPTION OF INVENTION

Figure 3:
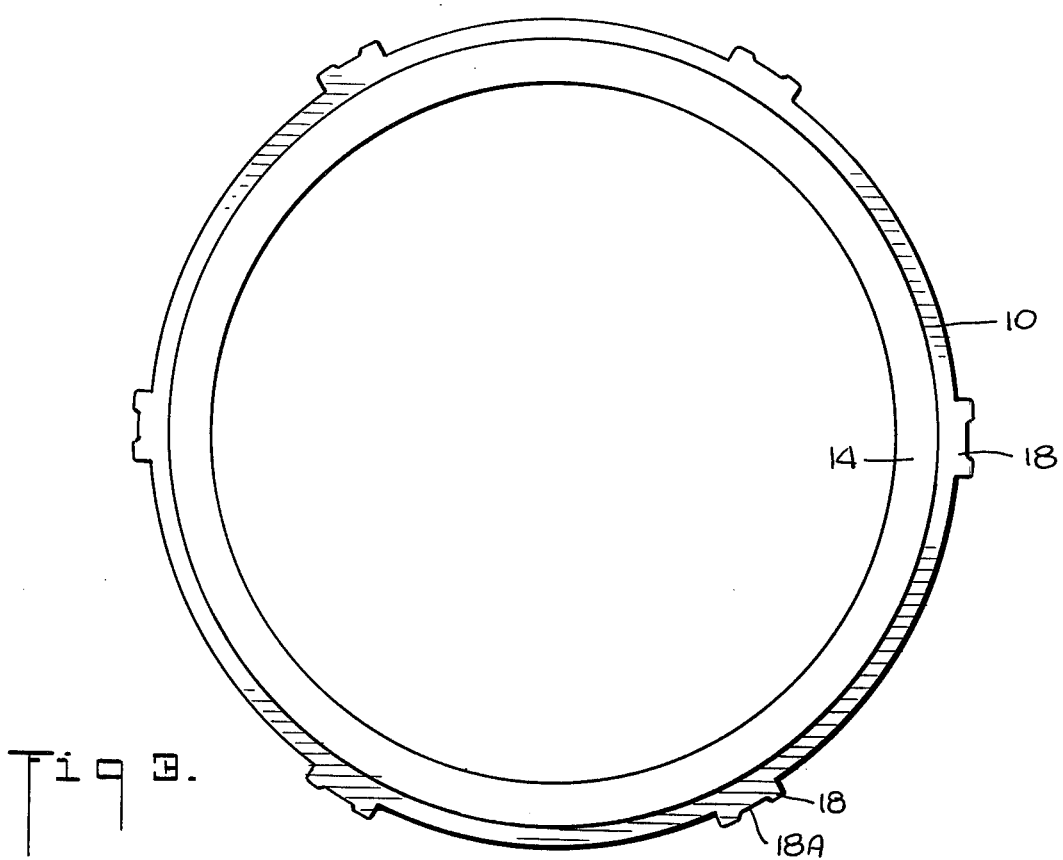
FIG. 3 is a plan view of the base of the terrarium.

Referring now to the drawings and more particularly to FIGS. 1 and 2, a terrarium in accordance with the invention comprises a disc-shaped base 10 and an inflatable, dome-shaped envelope 11 whose rim or mouth is bonded to a coupling ring 12.

Figure 4:
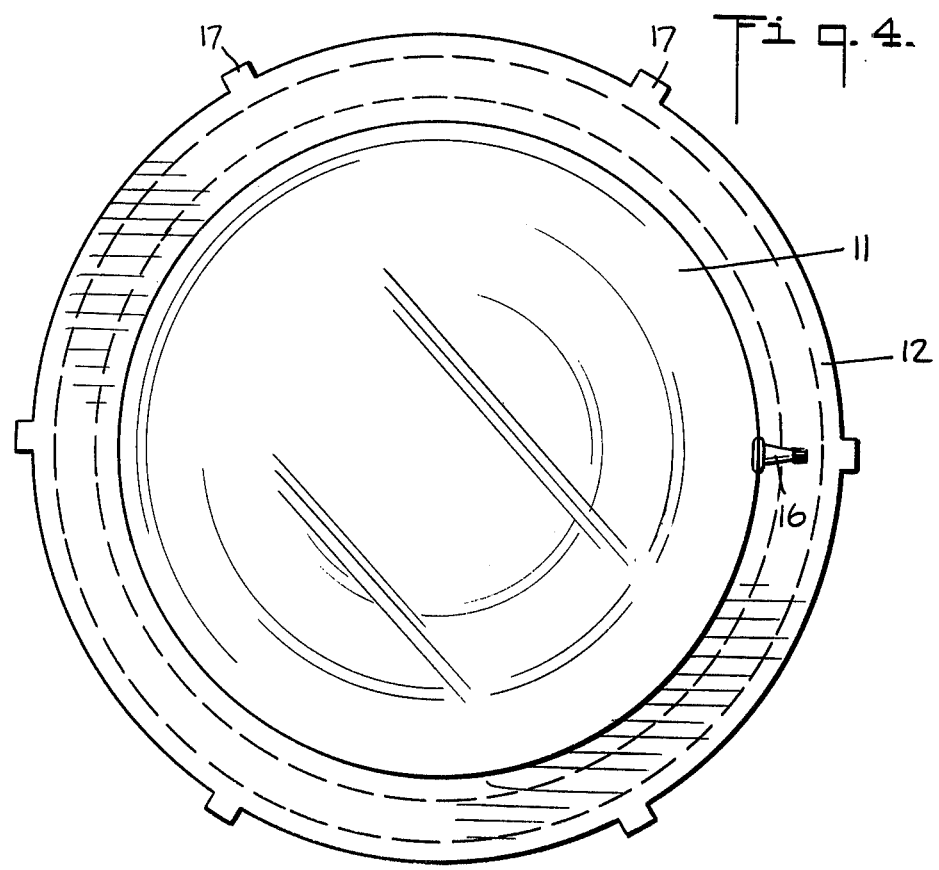
FIG. 4 is a plan view of the coupling ring of the terrarium.

Base 10, which is made from a suitable rigid plastic material such as acrylic paneling, is raised slightly above ground level by short feet 13 secured to the underside thereof. Attached to the face of base 10, as shown in FIG. 3, is an annular gasket 14 of a suitable sealing material such as rubber. Attached to the underside of coupling ring 12, as shown in FIG. 4, is a matching gasket 15 so that when the ring is pressed against the base the two gaskets mate and the interior of the dome is hermetically sealed. The ring may be formed of the same plastic material as the base.

Envelope 11 is fabricated of a transparent, flexible plastic film material such as polyvinyl chloride, "Mylar" or any other suitable clear plastic which is impermeable to air. The envelope is provided with a football valve 16, a tire valve or any other unidirectional valve for inflating the envelope by means such as a hand-operated tire pump. Installed on the base within the terrarium is a potted plant 17 or any article to be protectively displayed.

In order to removably attach the coupling ring to the base, ring 12 is provided along its periphery with a series of circumferentially-spaced flexible fingers 17 which project downwardly from the ring. As best seen in FIG. 5, each finger terminates in a slanted tooth 17A. The fingers on the ring cooperate with a series of projecting ledges 18 formed on the periphery of base 10, each ledge having a recess 18A adapted to accommodate a finger, such that when the ring is pressed down, the inclined edge of the tooth 17A is deflected outwardly by the recess of the ledge until the tooth falls below the ledge at which point it snaps back to latch the ring to the base. To disconnect the ring from the base, one simply pulls out the fingers.

Thus in assembling the terrarium, one sets base 10 at a selected site, such as on a table adjacent a window having good sunlight. The watered plant 17 is placed on the base, the plant being then covered by envelope 11 whose coupling ring 12 is pressed down on the base to cause the fingers to latch onto the ledges. Then the dome is blown up by a suitable pump so that it assumes its proper configuration. It will be appreciated that the envelope may be made to assume other forms such as cylinders, hemispheres or any other shape appropriate to the article to be placed in the terrarium.

While there has been shown and described a preferred embodiment of a terrarium in accordance with the invention, it will be appreciated that many changes and modifications may be made therein without, however, departing from the essential spirit thereof.

Thus, though the terrarium has been described as a plant housing, it is suitable also for the cultivation of seeds, for it provides a protective environment for this purpose. Another useful function of a terrarium in accordance with the invention is for the long-haul transportation of plants. On an extended trip, the inflated terrarium protects the plants and reduces the amount of care that is needed to maintain their health, whereas on the return trip the terrarium is deflated to save space. The advantages of a collapsible terrarium over structures heretofore used for the transportation of plants are obvious.

While the base of the terrarium assembly has been described as being made of plastic, it can also be made in a variety of other materials, such as aluminum, at a practical cost and weight. There is virtually no limitation on the size of the inflatable terrarium and it may in practice be structured to function as a low cost, sizeable greenhouse for enclosing a large number of plants. And while the terrarium has been described as being pump-inflated, it is to be understood that it may, particularly in small sizes, be mouth-inflated.

I claim:

1. A inflatable and deflatable collapsible closed terrarium assembly which can be inflated to assume a desired configuration for housing a potted plant or other watered article to be protectively enclosed, said assembly comprising a disc-like base and a dome attachable thereto, said dome being formed of a flexible, non-selfsupporting clear plastic film envelope having an open mouth, a coupling ring secured to the mouth of the envelope and sealably joinable to the base to form a hermetically-sealed enclosure enveloping said plant or other article to prevent evaporation therefrom, and a valve mounted on the envelope for selectively inflating said envelope to assume said configuration and deflating said envelope to a collapsed condition.

2. A terrarium as set forth in claim 1, wherein said envelope is formed of polyvinyl chloride.

3. A terrarium as set forth in claim 1, wherein said base and said coupling ring are provided with matching annular gaskets.

4. A terrarium as set forth in claim 1, wherein said base and said ring are provided with complementary fastening elements.

5. A terrarium as set forth in claim 4, wherein each fastening element is constituted by a downwardly projecting spring finger secured to the periphery of said ring and a recessed ledge secured to the periphery of said base, said finger passing through said recess and engaging said ledge.

* * * * *